United States Patent
Hirotsune et al.

(10) Patent No.: US 9,117,477 B2
(45) Date of Patent: Aug. 25, 2015

(54) PERPENDICULAR MAGNETIC RECORDING MEDIA HAVING NOVEL SEED LAYER

(71) Applicant: HGST Netherlands B.V., Amsterdam (NL)

(72) Inventors: Akemi Hirotsune, Odawara (JP); Ikuko Takekuma, Yokohama (JP); Hiroaki Nemoto, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 122 days.

(21) Appl. No.: 13/890,168

(22) Filed: May 8, 2013

(65) Prior Publication Data
US 2014/0334039 A1    Nov. 13, 2014

(51) Int. Cl.
G11B 5/66    (2006.01)
G11B 5/73    (2006.01)

(52) U.S. Cl.
CPC ...................... G11B 5/732 (2013.01)

(58) Field of Classification Search
None
See application file for complete search history.

(56) References Cited

U.S. PATENT DOCUMENTS

| | | | |
|---|---|---|---|
| 6,541,634 B2 | 4/2003 | Busch et al. | |
| 6,673,929 B2 | 1/2004 | Busch et al. | |
| 6,916,558 B2 | 7/2005 | Umezawa et al. | |
| 6,953,629 B2 | 10/2005 | Hintz et al. | |
| 7,666,531 B2 | 2/2010 | Iwasaki et al. | |
| 7,901,737 B2 | 3/2011 | Yasui et al. | |
| 2002/0002283 A1 | 1/2002 | Busch et al. | |
| 2003/0158414 A1 | 8/2003 | Busch et al. | |
| 2004/0161638 A1 | 8/2004 | Maeda et al. | |
| 2007/0153419 A1* | 7/2007 | Arai et al. | 360/131 |
| 2007/0237986 A1* | 10/2007 | Wu et al. | 428/831.2 |
| 2008/0024918 A1* | 1/2008 | Gouke | 360/135 |
| 2009/0116137 A1* | 5/2009 | Takekuma et al. | 360/75 |
| 2009/0195924 A1* | 8/2009 | Nemoto et al. | 360/110 |
| 2010/0159285 A1 | 6/2010 | Peng et al. | |
| 2010/0165500 A1* | 7/2010 | Suzuki et al. | 360/59 |
| 2011/0011733 A1 | 1/2011 | Yang et al. | |
| 2012/0044595 A1* | 2/2012 | Yahisa et al. | 360/75 |
| 2012/0052330 A1 | 3/2012 | Takekuma et al. | |

FOREIGN PATENT DOCUMENTS

| | | |
|---|---|---|
| JP | 2003327585 A | 11/2003 |
| JP | 2008091024 A | 4/2008 |
| JP | 4243758 B2 | 3/2009 |
| JP | 2012048784 A | 3/2012 |

OTHER PUBLICATIONS

English abstract of JP 2005-093016, Japan, Apr. 2005, pp. 1-2.*

(Continued)

*Primary Examiner* — Holly Rickman
(74) *Attorney, Agent, or Firm* — Zilka-Kotab, PC

(57) ABSTRACT

A magnetic medium for perpendicular magnetic data recording, having improved magnetic properties through use of a novel seed layer. The magnetic medium includes a substrate having a seed layer, a magnetic under-layer and a magnetic recording layer formed there-over. The seed layer includes an element selected from a first group of Cr, Co, Fe and Ni, and at least one element that is selected from the other elements of the first group or from a second group consisting of W, Mo and Ru. A buffer layer may be included between the substrate and the seed layer.

19 Claims, 15 Drawing Sheets

(56) References Cited

OTHER PUBLICATIONS

Yang et al., "Epitaxial Growth of L1 0-FePt Granular Thin Films on TriC/RuAi Underlayers," Oct. 2011, IEEE Transactions on Magnetics, vol. 47, No. 10, pp. 4077-4079, abstract only.

Tsai et al., "L1o CrPt underlayer of thickness effects on FePt film ordering," 2008 Journal of Physics, D: Applied Physics, vol. 41, No. 2.

Tanaka et al., "FePt films 2 nanometers thick with (001_preferential orientation on a Mg0 underlayer," Apr. 2011, Journal of Applied Physics, vol. 109, No. 7, pp. 07B716-07B716-3, abstract only.

\* cited by examiner

PERPENDICULAR MAGNETIC RECORDING MEDIA HAVING NOVEL SEED LAYER

FIELD OF THE INVENTION

The present invention relates to perpendicular magnetic data recording, and more particularly to a magnetic recording medium having a high surface recording density and to a magnetic recording device employing such a magnetic recording medium.

BACKGROUND OF THE INVENTION

A component of many computers and data server systems is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil is wrapped around the write pole and induces a magnetic flux that magnetizes the write pole when a current is passed through the coil. This results in a magnetic write field being generated through the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data. The polarity of the write field is dictated by the polarity of the write current through the write coil. The polarity is switched based on a write clock whose frequency and phase are controlled to optimize the data write process.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

As magnetic data density increases and the corresponding size of the magnetic bits recorded to the media shrinks, the magnetic signal becomes inherently unstable, especially at elevated temperatures. One proposed way to record thermally stable magnetic data at very high data densities involves the use of thermally assisted magnetic recording. Such recording uses a magnetic media having magnetic recording layer with a high magnetic anisotropy $K_u$ in a direction perpendicular to the plane of the surface of the media. Using thermally assisted magnetic data recording, the magnetic media is locally heated at the time of writing. This temporarily lowers the coercivity of the magnetic recording layer to allow the magnetization of the magnetic recording layer to be aligned by a magnetic write field from the magnetic recording head. The media then quickly cools, raising the magnetic coercivity and magnetic anisotropy of the magnetic recording layer and allowing the magnetic date recorded thereto to be thermally stable.

SUMMARY OF THE INVENTION

The present invention provides a magnetic medium for perpendicular magnetic data recording that includes a substrate and a seed layer formed over the substrate, the seed layer comprising an element selected from a first group consisting of Cr, Co, Fe and Ni and an element selected from a remaining element of the first group or from a second group consisting of W, Mo and Ru. The magnetic medium further includes a magnetic under-layer formed over the seed layer, and a magnetic recording layer formed over the magnetic under-layer.

The magnetic media can be embodied in a magnetic data recording system that includes an actuator, and a slider having a magnetic a magnetic read and write head formed thereon and connected with the actuator for movement adjacent to the magnetic media. In addition, the magnetic media can include a buffer layer that can have an amorphous or body centered cubic structure located between the substrate and the seed layer.

The perpendicular magnetic recording medium of the present invention is characterized by the sequential lamination on the substrate of the above described layers. The under-layer can be MgO, and the perpendicular magnetic recording layer can be a material such as FePt having an $L1_0$-type crystal structure. In addition, a protective layer and a lubrication layer can be provided above the perpendicular magnetic recording layer.

The crystal orientation of the MgO under-layer and FePt recording layer can be improved by the provision of the seed layer there-under. As a result, the dispersion during magnetic recording can be reduced, and the signal to noise ratio of the FePt medium can be increased. In addition, because the crystal orientation of the under-layer can be improved by the provision of the seed layer, the thickness of the under-layer can be reduced.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

Figure 1:
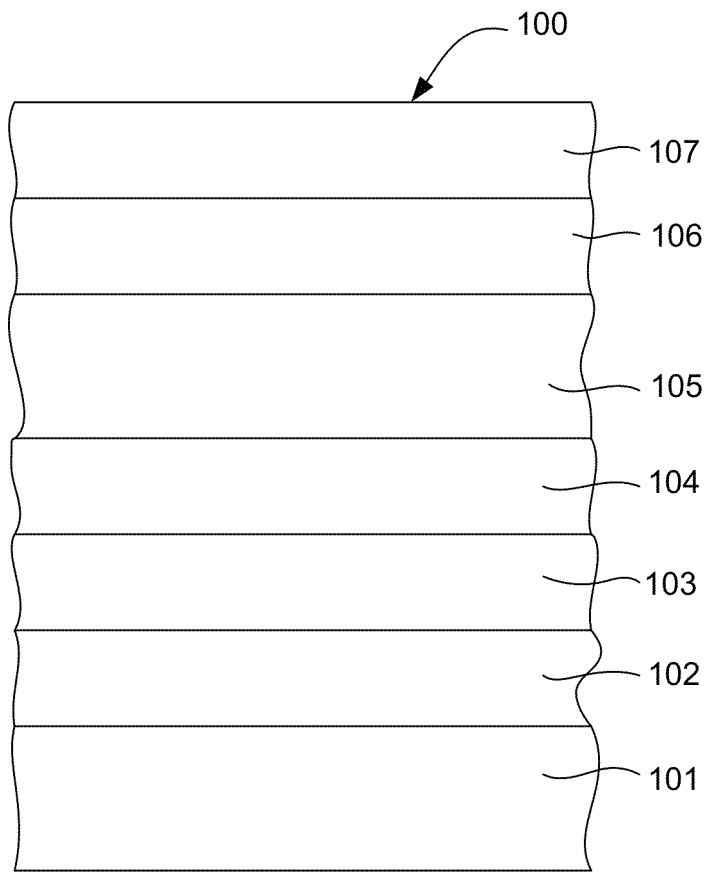
FIG. 1 is a cross sectional view of a magnetic recording medium according to an embodiment of the invention.

The following description is of the best embodiments presently contemplated for carrying out this invention. This description is made for the purpose of illustrating the general principles of this invention and is not meant to limit the inventive concepts claimed herein.

As discussed above, one way to meet the need for ever increasing data density involves the use of thermally assisted magnetic data recording. $L1_0$-type FePt order alloy materials possess a higher perpendicular magnetic recording anisotropy energy $K_u$ than currently used CoCrPt-based alloys and, accordingly, focus has shifted to the use of these materials as next-generation magnetic recording layers. Examples of such materials can be found, for example in IEEE Trans. Magn., 36 p 10 (2000).

In the employment of $L1_0$-type FePt ordered alloys as magnetic recording layers, it is essential that the exchange interaction within the crystal lattice is reduced, and a significant number of trials carried out with this aim in mind and which are based on the granulation of non-magnetic materials such as $SiO_2$ or C following the addition hereof to an $L1_0$-type FePt ordered alloy have been reported in recent years. The 'granulation' as referred to herein describes a process in which a structure comprising magnetic crystal grains of a material having a FePt alloy as its principal component and crystal grain boundaries of non-magnetic material which surround the grains are formed, thereby magnetically separating the magnetic grains.

The employment of an FePt alloy having an $L1_0$-type crystal structure in the magnetic recording layer necessitates that the FePt Layer define a (001) orientation. The creation of an (001) orientation based on the employment of a suitable material as an under-layer fabricated on the lower portion of an FePt layer has been reported, for example in IEEE Trans. Magn. 44, p. 3547 (2008). In addition, in order to normalize the FePt alloy and form it with a (001) orientation, it must be heated to a temperature of at least 300 degrees C. during, prior to or following the deposition of the film. This has been reported, for example in Japanese Laid-Open Patent Application No. 2012-48784.

The employment of an FePt alloy having a $L1_0$-type crystal structure as the magnetic recording layer necessitates the fabrication of a MgO under-layer, along with the heating and normalization of an FePt layer thereon to produce a (001) orientation. To produce a high signal to noise ratio (SNR), the orientation of the FePt layer must be improved, and the reversed magnetic field dispersion during recording must be reduced. However, because the orientation of the FePt layer is largely dependent upon the under-layer and the crystal structure, when the crystal orientation of the under-layer is poor, the orientation of the FePt layer is adversely affected. For these reasons, a satisfactory crystal orientation has not been producible in an FePt layer when the grain size of an FePt alloy medium having an $L1_0$-type crystal structure is small and is, for example, of the order of not more than 10 nm.

FIG. 1 shows a cross sectional view of a portion of a magnetic media according to an embodiment of the invention. The perpendicular magnetic recording media 100 includes: a buffer layer 102 formed on a substrate 101; a seed layer 103 formed on the buffer layer 102; an under-layer 104 formed on the seed layer 103; a perpendicular magnetic recording layer 105 formed on the under-layer 104; an overcoat layer 106 formed on the magnetic recording layer 105 and a lubricant layer 107 formed on the overcoat layer 106.

Various substrates 101 having planar surfaces may be employed. By way of example, the substrate 101 can be a reinforced glass, a crystallized glass, a Si substrate or a thermally-oxidized Si substrate. The buffer layer 102 can be an amorphous Ni alloy having Ni as its principal component and containing at least one of the element types Nb and Ta. Nb is preferably added to the Ni in a range between not less than 20 atomic percent and not more than 70 atomic percent, while Ta is preferably added thereto in a range between not less than 30 atomic percent and not more than 60 atomic percent. In addition, Zr may be added thereto.

The under-layer 104 can be constructed of a thin film having MgO as its principle component. The under-layer preferably has 40 to 55 atomic percent O and 40-55 atomic percent Mg. The same properties are able to be produced when other impurities are blended therewith provided such impurities do not exceed a concentration of about 10 atomic percent.

The perpendicular magnetic recording layer 105 can be constructed of an alloy having FePt as its principal component and having an $L1_0$-type crystal structure and grain boundaries of a non-magnetic material such as C, carbides, nitrides and oxides. In addition, at least one of Ag, Au, and Cu may be added to the perpendicular magnetic recording layer 105 to make ordered temperature lower.

The overcoat 106 can be constructed of a hard material such as C or diamond like carbon (DLC).

Various thin film fabrication techniques can be employed for the deposition of the various films 102-107 over the substrate 101. Such methods include DC magnetron sputtering, RF magnetron sputtering or Molecular Beam Epitaxy (MBE). Because these sputtering method afford a comparatively fast film manufacturing speed and a control of microstructure and thickness distribution of the film, they are suitable for use on a mass production scale.

The media 100 also includes a seed layer 103 that is located between the buffer layer 102 and the under-layer 104. The seed layer 103 promotes a desired grain structure and consequently desired magnetic properties in the above applied layers 104, 105. In one possible embodiment of the invention (embodiment 1) the seed layer 103 is constructed of a NiCrW alloy. More preferably the seed layer can be constructed of $Ni_{86}Cr_6W_8$ and can have a thickness of about 1 nm. The buffer layer 102 can be constructed of $Ni_{62}Ta_{38}$ and can have a thickness of about 100 nm. The under-layer 104 can be constructed of MgO and can have a thickness of about 12 nm. The recording layer 105 can be constructed of $(Fe_{45}Pt_{45}Ag_{10})_{70}$ $(SiO_2)_{30}$ and can have a thickness of about 10 nm. The protective overcoat layer can be constructed of carbon and can have a thickness of 3 nm. Each of the layers 102, 103, 104, 105 and 106 can be deposited, for example, by DC sputtering or RF sputtering. Thereafter, the lubricant layer 107 can be coated onto the overcoat 106 to a thickness of, for example, 1 nm.

Figure 9:
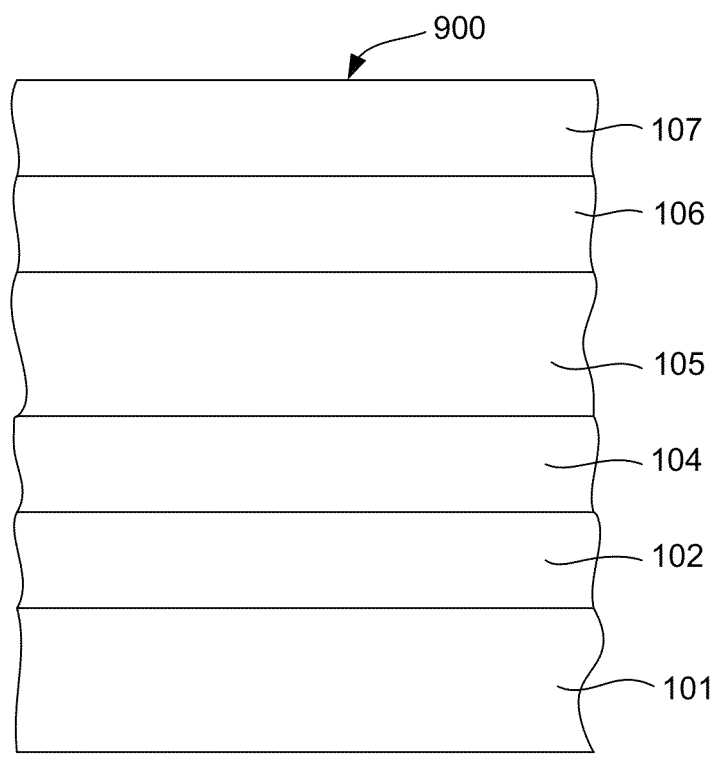
FIG. 9 is a cross sectional view of a magnetic media that does not employ a seed layer of the present invention.

For purposes of comparison, FIG. 9 shows a cross sectional view of a magnetic media 900 having no seed layer. This media of FIG. 9 includes a substrate 101, and a buffer layer 102 formed over the substrate 101. The buffer layer 102 is constructed of approximately 100 nm of $Ni_{62}Ta_{38}$. An under-layer 104 is formed directly on the buffer layer 102 and is constructed of approximately 12 nm of MgO. A recording layer 105 is deposited over the under-layer 104 and is constructed of approximately 10 nm $(Fe_{45}Pt_{45}Ag_{10})_{70}(SiO_2)_{30}$. A carbon overcoat 106 having a thickness of about 3 nm is deposited over the recording layer 105, and a lubricant layer 107 having a thickness of about 1 nm is deposited over the overcoat 106. The layers 102, 103, 104, 105, 106 can be deposited by a method such as DC or RF sputtering.

Figure 2A:
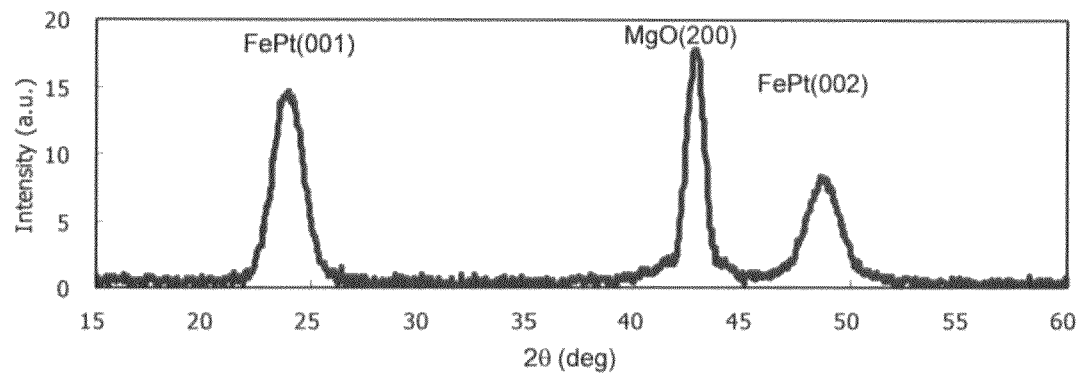
FIG. 2a is a graph showing the crystal orientation of a magnetic media having a seed layer according to an embodiment of the invention.
Figure 2B:
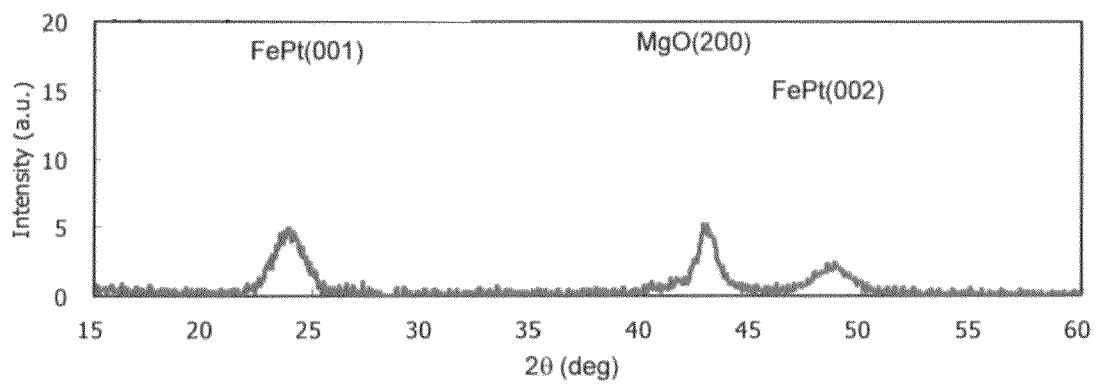
FIG. 2b is a graph showing the crystal orientation of a magnetic media not having a seed layer according to the present invention.

FIG. 2 shows the results of an examination of the crystal orientation of each of the media 100, 900 described above with reference to FIGS. 1 and 9. An X-ray diffraction device was employed for the evaluation of crystal orientation. The vertical axis shows the intensity of the diffraction peak for each crystal surface, while the horizontal axis expresses the angle (2). The higher the diffraction peak intensity, the better the crystallinity.

These results indicate that, compared with the comparative example 900 of FIG. 9, the MgO under-layer 104 (200) peak is better for the media 100 of FIG. 1 than for the media 900 of FIG. 9. Also, the FePt (001), (002) peaks thereof are better and the crystal orientation is improved in the media 100 of FIG. 1 as compared with the media 900 of FIG. 9. In addition, in the embodiment 100 illustrated in FIG. 1, the diffraction peak of the seed layer either cannot be seen, or is very small with respect to the MgO (200) peak. Therefore, it can be seen that the seed 103 constitutes a film in which, the more amorphous or smaller the level of the crystal diffraction peak is, the worse the crystal orientation is.

Figure 3A:
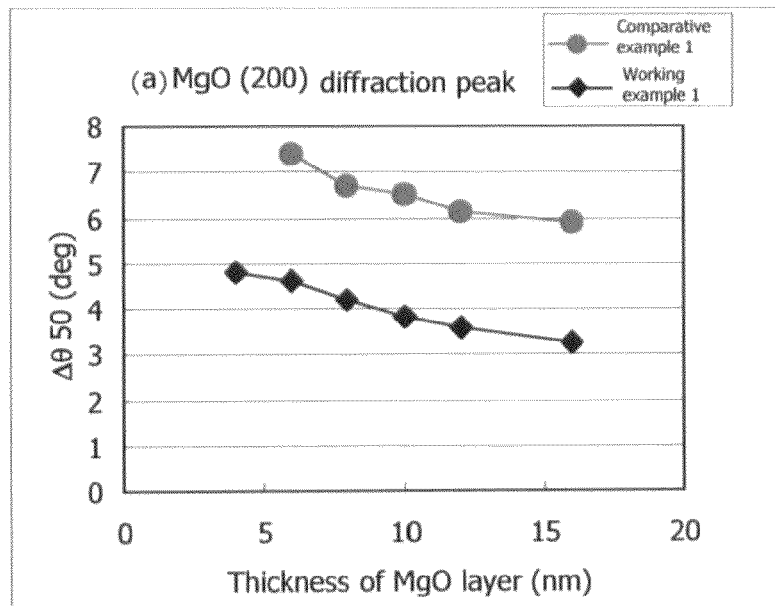
FIG. 3a is a graph showing the under-layer film thickness for a magnetic media of the present invention.
Figure 3B:
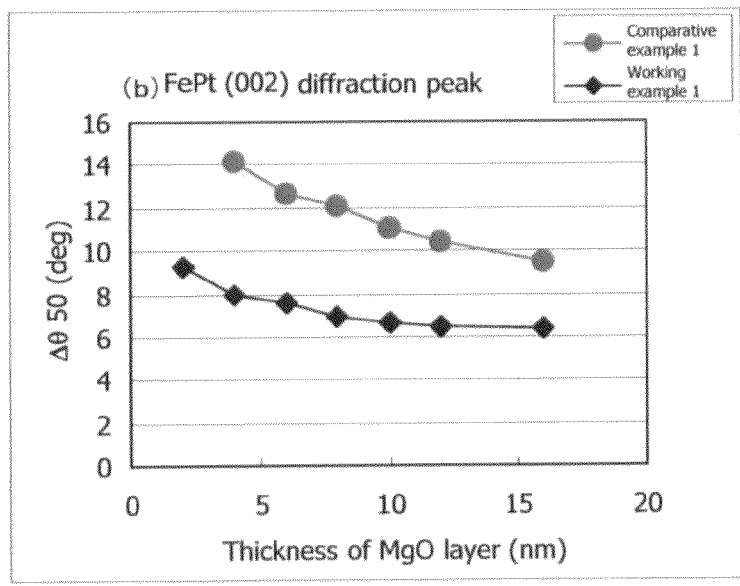
FIG. 3b is a graph showing the under-layer film thickness for a magnetic media not employing the present invention.

FIGS. 3a and 3b show the MgO under-layer 104 and FePt layer crystal orientation results for the embodiment 100 of FIG. 1 (shown in FIG. 3a) and for the comparative structure 900 of FIG. 9 (shown in FIG. 3b) when the thickness of the MgO film 104 is altered. Here, for the purpose of examining the crystal orientation of the FePt layer and the under-layer, 2 was determined from the FePt (002) and MgO (200) diffraction peaks and employed for an evaluation of the full width at half-maximum of the rocking curve (Δ50) thereof. While the evaluation of embodiment 100 of FIG. 1 and the comparative structure 900 of FIG. 9 includes the use of MgO under-layers 104 of 2 nm and 4 nm, an inability to determine a Δ50 broad rocking curve for these examples prevents plotting of the data thereof on the graph. In other words, this means that for the comparative structure 900 as plotted in FIG. 3a, the Δ50 orientation is significantly worse for a MgO under-layer of less than 6 nm than for a MgO under-layer of 6 nm. For the embodiment 100 as plotted in FIG. 3a, the Δ50 orientation is significantly worse for a MgO under-layer 104 of less than 4 nm than for a MgO under-layer of 4 nm. This also means that for comparative example 1 as plotted in FIG. 3b, the Δ50 orientation is significantly worse for a MgO under-layer 104 of less than 4 nm than for a MgO under-layer of 4 nm.

It can be understood from these graphs that, for the embodiment 100 which includes the seed layer 103, the Δ50 of the MgO is reduced across the entire film thickness range of the MgO under-layer and, as a result, that the Δ50 of the FePt fabricated on the under-layer is reduced. In turn, the crystal orientation is improved thereby.

Figure 4A:
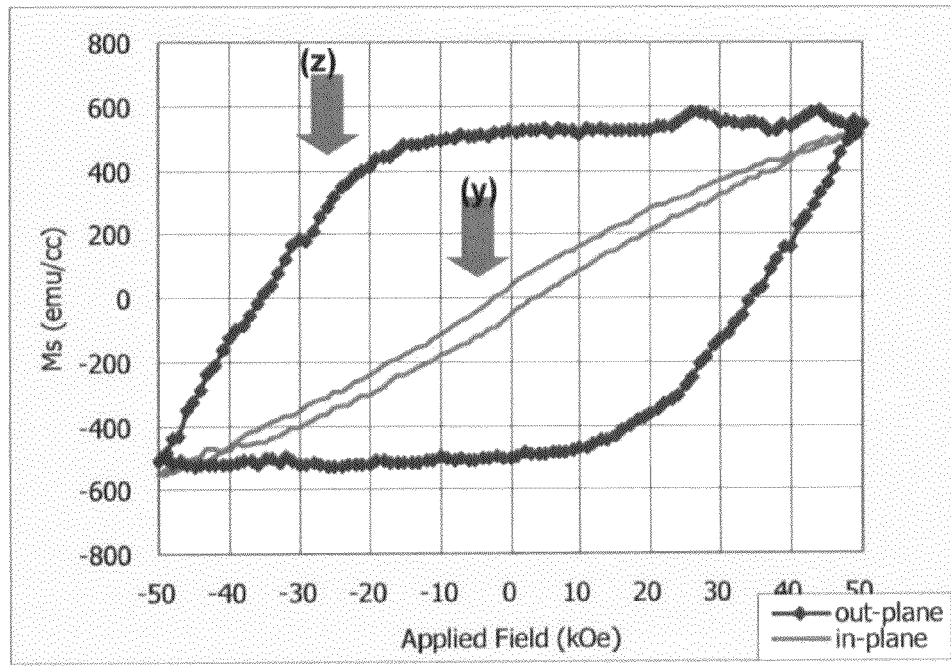
FIG. 4a is a graph showing magnetic properties of magnetic recording layer of a media according to an embodiment of the present invention.
Figure 4B:
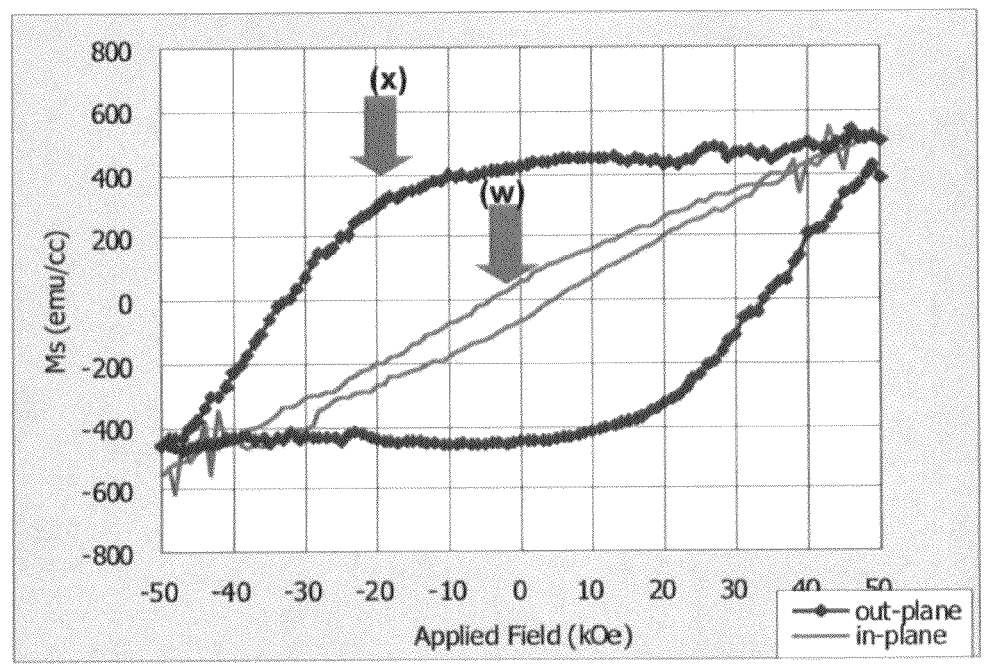
FIG. 4b is a graph showing the magnetic properties of a magnetic recording layer of a media not employing the present invention.

FIGS. 4a and 4b show the comparative results for the magnetic Hysteresis loop (MH loop) of embodiment 100 of FIG. 1 as shown in FIG. 4a thereof as compared with the comparative structure 900 of FIG. 9 as shown in FIG. 4b. The loop in the perpendicular (out-of-plane) direction of the medium of comparative structure 900 describes a gently sloping shoulder in the region thereof denoted by the arrow (x), and this is indicative of a large, reversed magnetic field dispersion. The broad spread across approximately 10 kOe in the region wherein Ms denoted by the arrow (w) is 0 emu/cc in the loop in the in-plane direction of the medium of comparative structure 900 is also indicative of a large dispersion. On the other hand, the broad shoulder of the loop denoted by the arrow (z) of the loop in the perpendicular direction (out-of-plane) of the medium of embodiment 100 is indicative of a reduced, reversed magnetic field dispersion and also indicates an increase in the coercivity to approximately 36 kOe. It is clear from the reduction in the spread loop in the in-plane direction of the medium of embodiment 100 that to approximately 6 kOe in the region where Ms denoted by arrow (y) is 0 emu/cc that the dispersion has been reduced. Because the orientation of the under-layer is improved by the fabrication of the seed layer and, accompanying this, the crystal orientation of the FePt layer is improved, a medium of satisfactory magnetic characteristics is able to be produced.

Figure 5A:
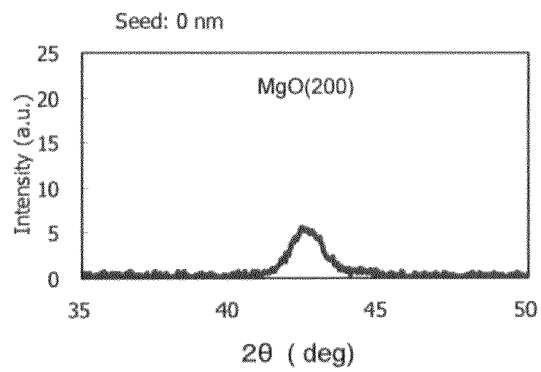
FIGS. 5a-f. are graphs showing crystal orientation of a perpendicular magnetic recording layer of a media according to an embodiment of the invention for various seed layer thicknesses.
Figure 5D:
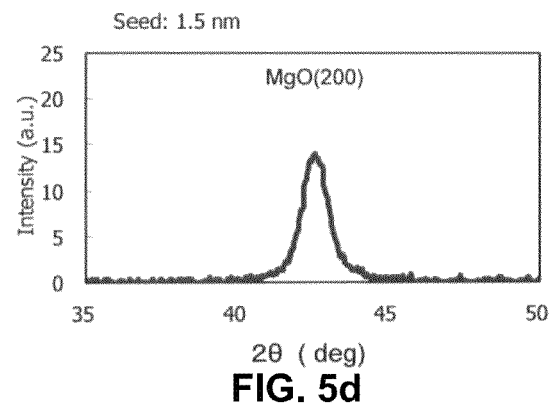
Figure 5B:
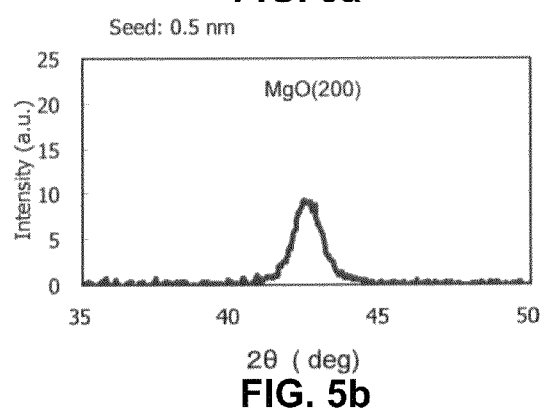
Figure 5E:
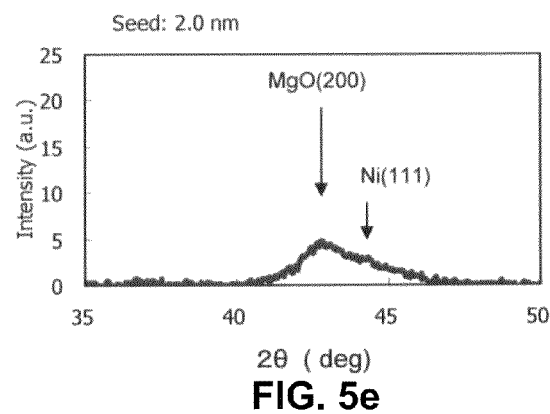
Figure 5C:
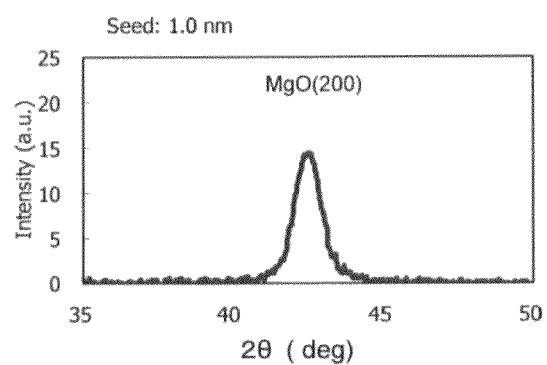
Figure 5F:
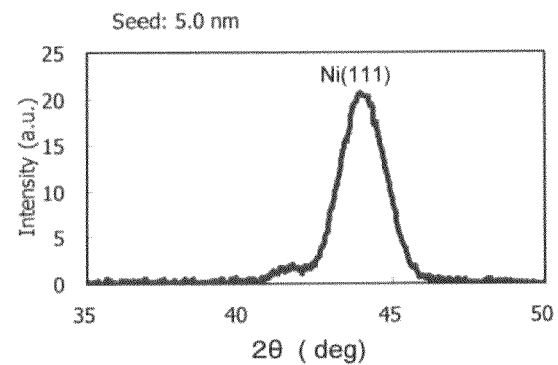
Figure 6A:
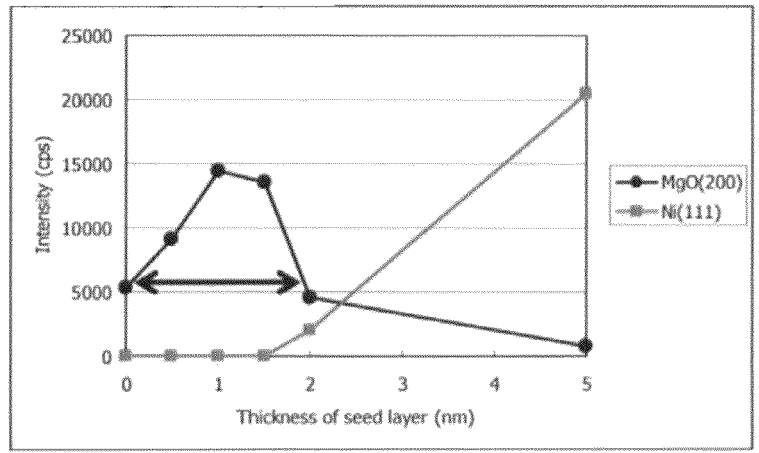
FIGS. 6a-c are graphs showing the crystal orientation of a perpendicular magnetic recording medium according to embodiments of the invention with varying seed layer thickness.

FIGS. 5a-f and FIG. 6a show the results obtained following an examination of the seed layer film thickness dependency for the medium 100 of FIG. 1. FIGS. 5a-f show a comparison of the MgO (200) and Ni (111) diffraction peaks when the seed layer film thickness is changed from 0 nm to 5 nm. It is clear that, compared to when the seed layer 103 is 0 nm as shown in FIG. 5a, the MgO (200) diffraction peak intensity increases from a seed layer 103 of 0.5 to 1.5 nm (FIGS. 5b, 5c, 5d) and, in turn, that the crystal orientation of the MgO under-layer 104 improves. In addition, across this range, no diffraction peaks having their origin in the seed layer components of Ni, Cr, W and/or alloys thereof were observed. It is clear that, when the seed layer is 2 nm as shown in FIG. 5e, the MgO (200) diffraction peak drops and defines a broad peak in the region of 44.5 degrees, and that a week Ni (111) peak exists. At a seed layer of 5 nm, the Ni (111) becomes dominant, and the MgO (200) diffraction peak is weaker. FIG. 6a shows the plotted results of each diffraction peak intensity of these diagrams against the film thickness of the seed layer. This confirms that when the seed layer is between 0.5 and 1.5 nm, the MgO (200) diffraction peak intensity increases, and the Ni (111) or similar diffraction peaks having their origin in the seed layer material are either non-existent or very weak.

These results indicate that, for a perpendicular magnetic recording medium having the seed layer 103, the crystal orientation of the MgO under-layer is improved and, in turn, better characteristics are exhibited by the medium 100 as the film thickness of the seed layer is changed from 0.5 to 1.5 nm. A thicker seed layer 103 can be regarded as giving rise to the domination of the crystal orientation of the seed layer material, and to the inhibition of the MgO crystal orientation. For this reason, the seed layer is preferably amorphous.

Figure 6B:
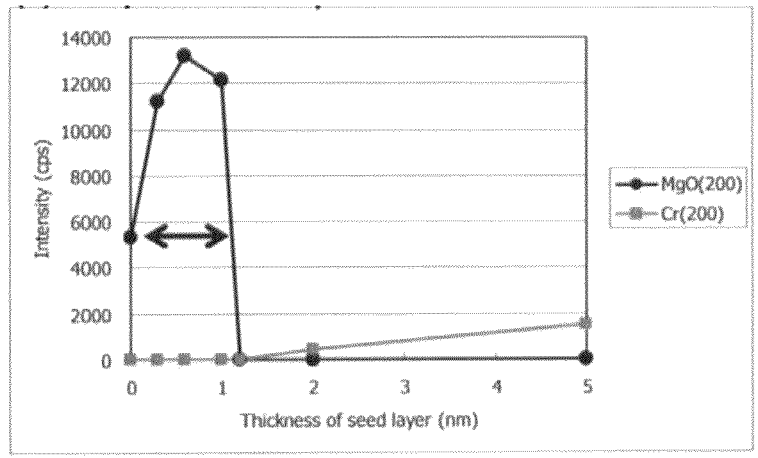

FIG. 6b shows the results for a comparative example of a magnetic medium having a seed layer that is constructed of Cr. While the MgO (200) diffraction peak intensity increases from a seed layer thickness of 0.3 to 0.9 nm, once it exceeds 1 nm, slight evidence of the existence of a Cr (200) diffraction peak is detected and, thereafter, the MgO (200) diffraction peak rapidly decreases. In the case of Cr, while the MgO crystal orientation is not inhibited by a seed layer 103 of having a thickness of less than 1 nm, for a seed layer 103 having a thickness greater than 1 nm the seed layer crystallizes and is thought to inhibit the MgO crystal orientation. In this case, the film thickness range resulting in a satisfactory MgO crystal orientation is very narrow.

Figure 6C:
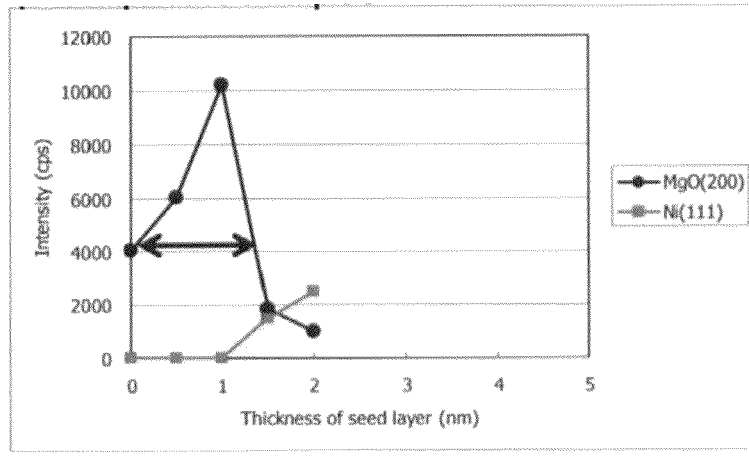

FIG. 6c shows the results of another comparative example (comparative example 3) having a seed layer that is constructed of Ni. While the MgO (200) diffraction peak intensity increases from a seed layer thickness of 0.5 to 1.0 nm, once it exceeds 1 nm, a Ni (111) diffraction peak rapidly decreases. In the case of Ni, while the MgO crystal orientation is not inhibited in the thickness range of the seed layer of less than 1 nm, in a thickness range greater than 1 nm the seed layer crystallizes and is thought to in inhibit the MgO crystal orientation. Again, the thickness range resulting in satisfactory MgO crystal orientation is very narrow.

In addition to the embodiments and seed layer compositions discussed above various embodiments and seed layers 103 having other compositions can provide desired results as well. The various embodiments will be described herein below as embodiment 6, embodiment 7, etc. For purposes of comparison, these embodiments are compared herein with various other structures that will be referred to herein as comparative example 8, comparative example 12, etc.

Figure 7A:
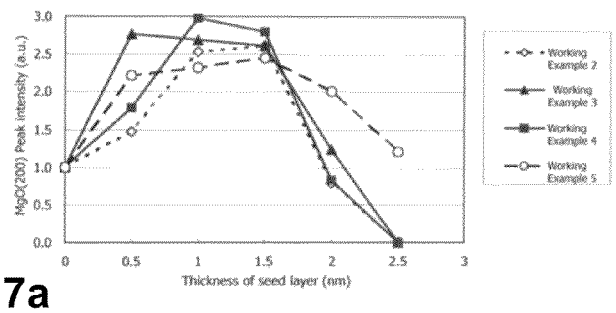
FIGS. 7a-d are graphs of MgO under-layer crystal orientation of the seed layer of magnetic media according to various embodiments of the invention and for a magnetic media not employing the present invention.
Figure 7B:
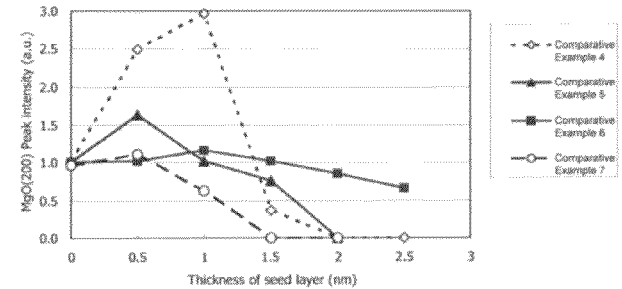
Figure 7C:
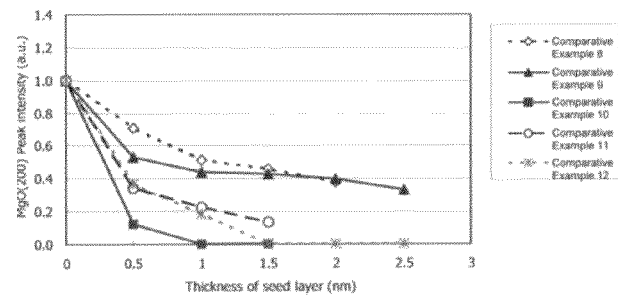
Figure 7D:
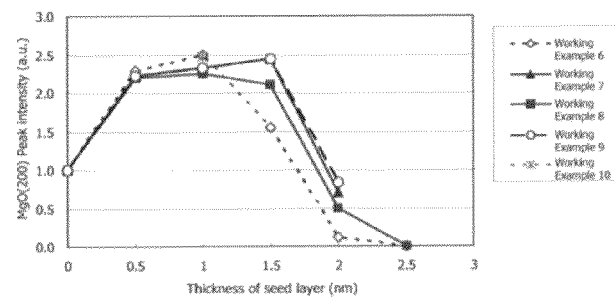

FIG. 7c shows the results for comparative examples 8 to 12 of a seed layer constituted from elements other than the Group A and Group B elements described above. The results are shown for a Cu seed layer in comparative example 8, a Ta seed layer in comparative example 9, a Ti seed layer of comparative example 10, a Nb seed layer in comparative example 11, and a Pt seed layer in comparative example 12. The fabrication of these seed layers of the above comparative examples adversely affect the MgO crystal orientation and, accordingly, it is clear that these materials are unsuitable for use as see layer materials. However, as illustrated, for example, in FIG. 7d, seed layers including the addition of elements other than those from the groups A and B discussed above can provide beneficial results. FIG. 7d shows the results for the following embodiments having the following seed layers compositions: embodiment 6 having a seed layer 103 comprising $Cr_{88}Co_{10}Ti_2$; embodiment 7 having a seed layer 103 comprising $Ni_{88}Cr_{10}V_2$; embodiment 8 having a seed layer 103 comprising $Ni_{90}Co_8Ti_2$; embodiment 9 having a seed layer 103 comprising $Ni_{90}Cr_8Zr$; and embodiment 10 having a seed layer 103 comprising $Cr_{90}W_8Ti_2$. These results indicate that the addition of elements other than the Group A or B elements in a small concentration of not more than 2 atomic percent has the effect of minimizing the adverse affect on the MgO crystal orientation and, in addition, broadening the film thickness range across which a satisfactory MgO crystal orientation is produced and, accordingly, the beneficial effect of the seed layer 103 are exhibited thereby.

Figure 8A:
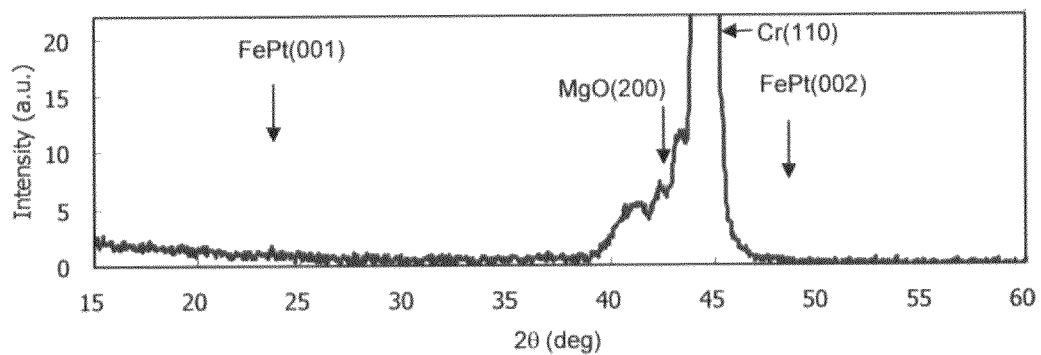
FIG. 8a is a graph showing the crystal orientation of a magnetic media according to an embodiment of the invention.
Figure 8B:
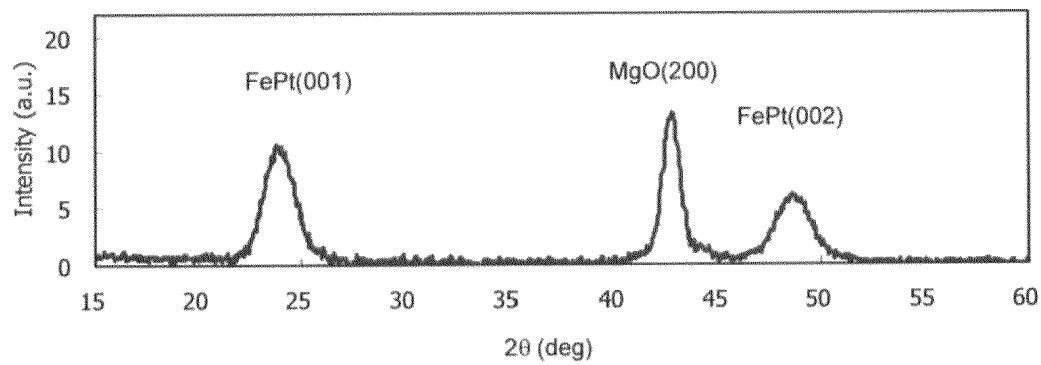
FIG. 8b is a graph showing the crystal orientation of a magnetic media not employing the present invention.

FIGS. 8a, 8b and table as below show examples of when the buffer layer 102 is constructed of Cr. The film thickness in nanometers (nm) is shown in parentheses in the table. The Cr (110) as used herein means a Cr layer having a (110) crystal orientation, while Cr (100) means a Cr layer with a (100) orientation. Embodiment 11 for which the results are shown in FIG. 8b has a buffer layer 102 that comprises Cr (100), while comparative example 13 for which the results are shown in FIG. 8a has a Cr (110) seed layer. Normally, the lamination of Cr results in the formulation of a (110) orientation and in embodiment 11, the Cr was laminated following the implementation of a pre-lamination oxygen treatment. This resulted in the production of a (100) orientation in the Cr buffer layer 102.

A buffer layer that defines Cr (100) or a similar body centered cubic (bcc) structure has no adverse effect on the MgO crystal orientation and, accordingly, the crystal orientation of the MgO layer and the FePt layer is further improved by the provision of a seed layer. A buffer layer which constitutes as an amorphous layer such as Ni—Ta, as is the case of the first described embodiment, is preferable because of the better orientation afforded thereby.

However, as is seen in comparative example 13, even if the same Cr material is employed, if the orientation plane is unaligned as is the case for Cr (110), the MgO crystal orientation is adversely affected, and even the provision of a seed layer does not result in improved crystal orientation of the MgO layer and the FePt layer. Based on this, a layer having a bcc structure is preferred for use as the buffer layer 102, and an amorphous layer is even more preferred.

| | Buffer layer | Seed layer composition | MgO (200) Δ 50 (deg) | FePt (002) Δ 50 (deg) |
|---|---|---|---|---|
| Comparative Example 1 | NiTa (100 nm) | None | >10 | >10 |
| Embodiment 1 | NiTa (100 nm) | NiCrW (1 nm) | 3.6 | 6.4 |
| Comparative Example 13 | NiTa (100 nm)/Cr110 (10 mm) | NiCrW (1 nm) | >10 | >10 |
| Embodiment 11 | NiTa (100 nm) Cr100 (10 nm) | NiCrW (1 nm) | 4.1 | 6.9 |

A perpendicular magnetic recording media of the above described embodiments can be prepared using an inline-type high-speed sputtering device. A plurality of film deposition process chambers, a heating chamber and a substrate introduction/withdrawal chamber of this device are calibrated, and the respective chambers are independently exhausted. A process comprising the exhaustion of the chambers to a vacuum of not more than $1 \cdot 10^{-4}$ Pa, and the movement of a carrier mounted on a substrate to each process chamber was implemented in sequence. The heating of the substrate was performed in the heating chamber, and the temperature during heating was controlled on the basis of the heater input power and time. An atomic force microscope (AFM) can be employed for the evaluation of surface roughness. For the evaluation of roughness, the center line average roughness (Ra) and the surface roughness mean-square value ($R_q$) were used as indices.

Figure 10A:
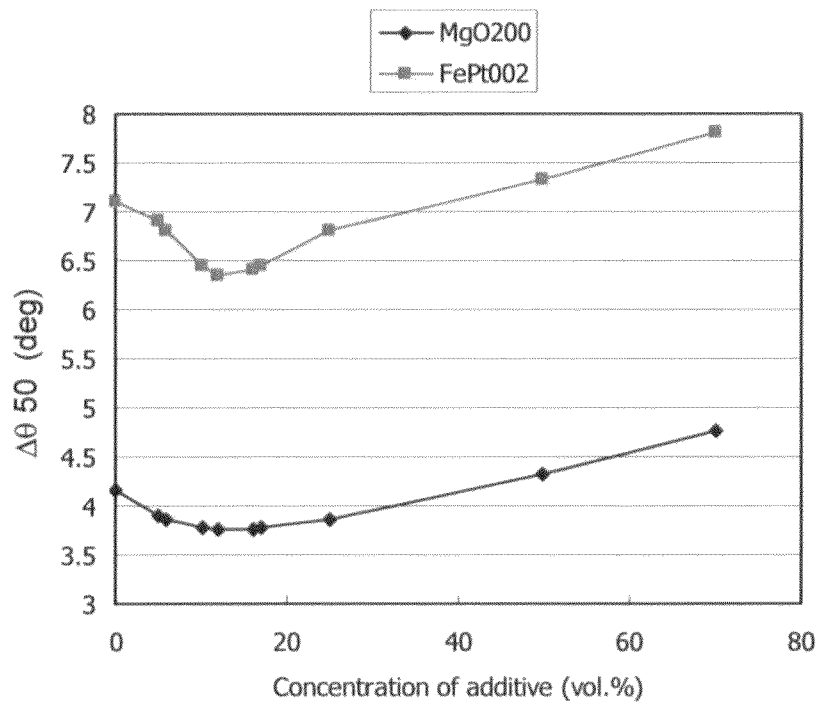
FIG. 10a is a graph showing the crystal orientation of a MgO layer and FePt layer of a media at varying composition ratios of Ni—W.
Figure 10B:
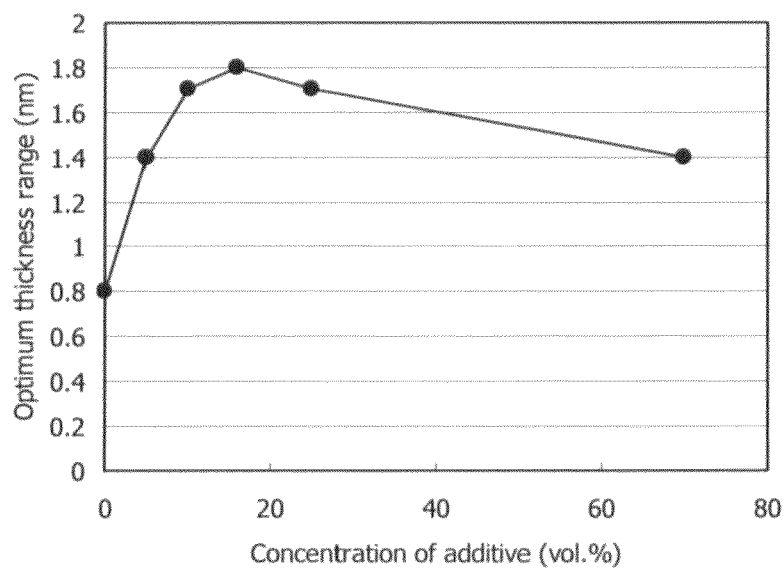
FIG. 10b is a graph showing the optimal film thickness of a seed layer of a magnetic media at varying composition ratios of Ni—W.

Still other embodiments having various composition ratios and crystal orientations are available, which will be referred to herein as embodiments 12 through 16. FIG. 10a shows results for an embodiment (embodiment 12) in which the seed layer composition was altered with the film thickness of the seed layer 103 was maintained at approximately 1 nm. The horizontal axis expresses the concentration of W added to the Ni. The orientation Δ50 of FePt (002) and MgO (200) was plotted on the vertical axis of (a), while for the composition is plotted in (b), the film thickness of the seed layer was altered, and the range of the seed layer film thickness in which the effects thereof are plotted as the optimum film thickness. In this way, the optimum film thickness width is increased by not less than 1.4 nm and, in turn, the process margin is improved if W is added to Ni in a concentration of 5 at %. Because the addition of W in a concentration more than 25 atomic percent has an adverse affect on the crystal orientation of the FePt (002) and the MgO (200) and produces results in excess of 6.8 degrees and 3.9 degrees respectively, the added concentration thereof is preferably not less than 5 atomic percent and not more than 25 atomic percent. An added W concentration of not less than 10 atomic percent and not more than 17 atomic percent that produces an FePt (002) orientation of not more than 6.5 degrees is more preferred.

Figure 11A:
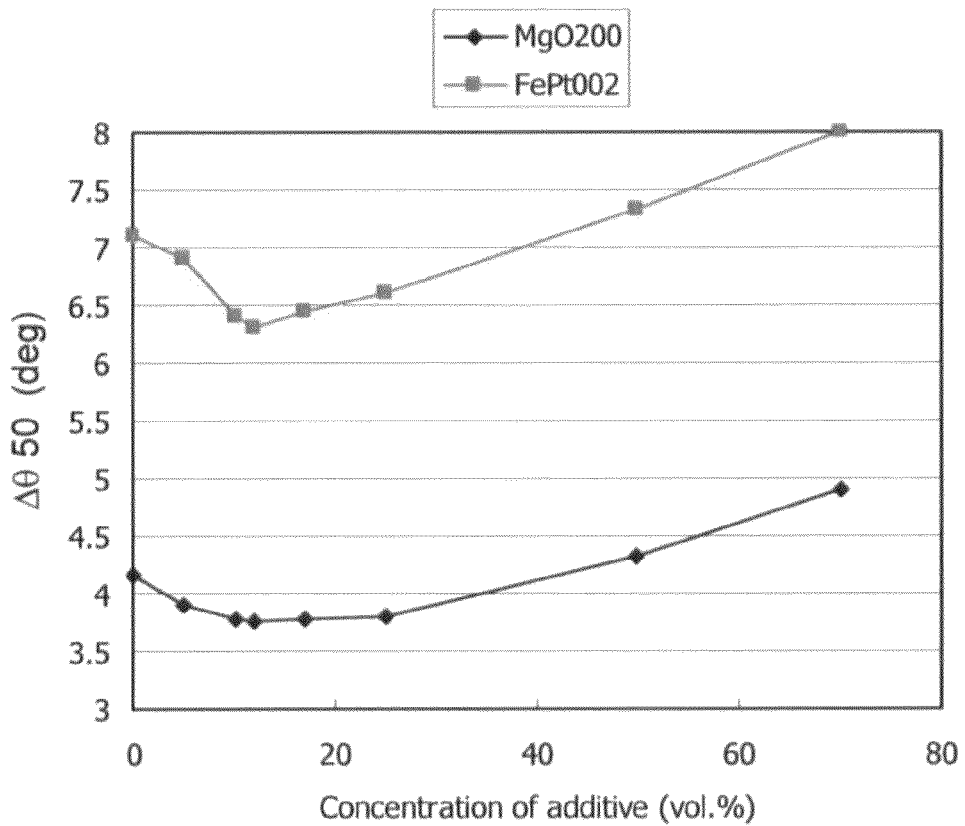
FIG. 11a is a graph showing the crystal orientation of a Mgo layer and FePt layer of a media at varying composition ratios of Ni—Cr—W.
Figure 11B:
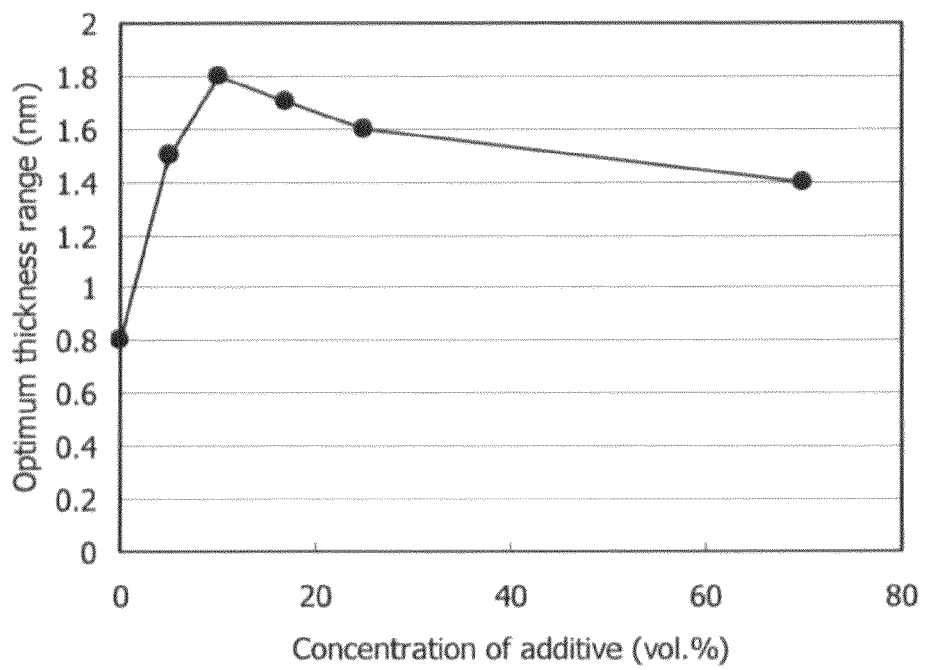
FIG. 11b is a graph showing the optimal seed layer thickness of a magnetic media at varying composition ratios of Ni—Cr—W.

Similarly, FIG. 11a shows results for another embodiment (embodiment 13) in which the composition of the seed layer 103 was altered with the film thickness of the seed layer maintained at approximately 1 nm. The horizontal axis expresses the total concentration of Cr and W added to the Ni. The absence of a marked difference resulting from the alteration of ratio of the added concentrations, as well as the sum total of the added concentrations thereof, is significant. The orientation Δ50 of FePt (002) and MgO (200) are plotted on the vertical axis of (a), while for the compositions plotted in (b), the film thickness of the seed layer was altered, and the range of the seed layer film thickness in which the effects thereof were observed was examined and plotted as the optimum film thickness. In this way, the optimum film thickness is increased and the process margin is improved if Cr and W are added to the Ni in a total concentration of 5 atomic percent. It is clear there-from that, because a sum total of the added Cr and W greater than 25 atomic percent has an adverse effect on the crystal orientation of FePt (002) and MgO (200), the added concentration thereof is preferably not less than 5 atomic percent and not more than 25 atomic percent. The added concentration thereof is even more preferably not less than 20 atomic percent and not more than 17 atomic percent.

Figure 12A:
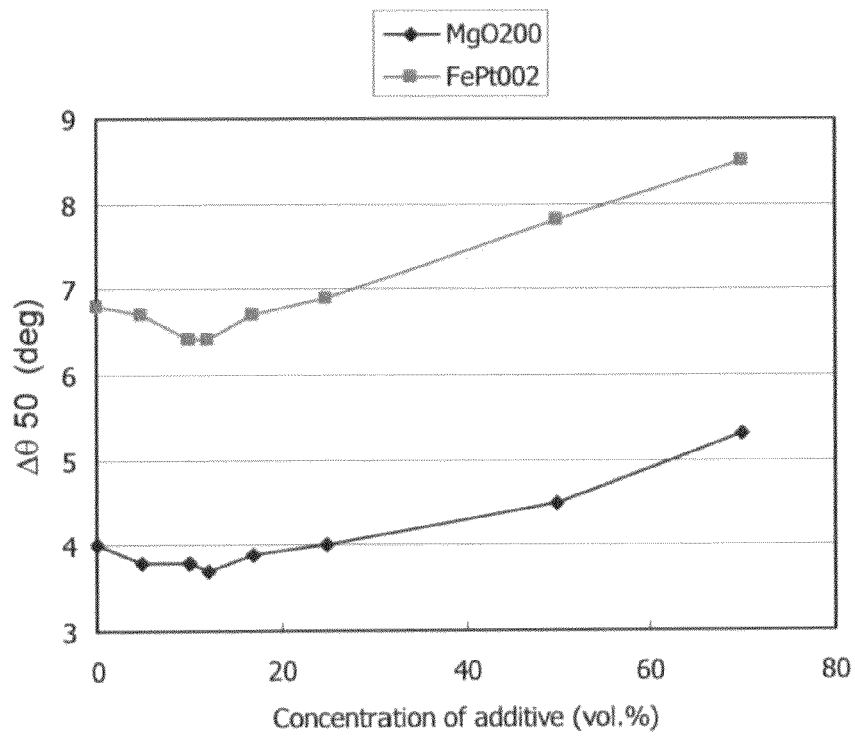
FIG. 12a is a graph showing the crystal orientation of a MgO layer and FePt layer of a media at varying composition ratios of Cr—W.
Figure 12B:
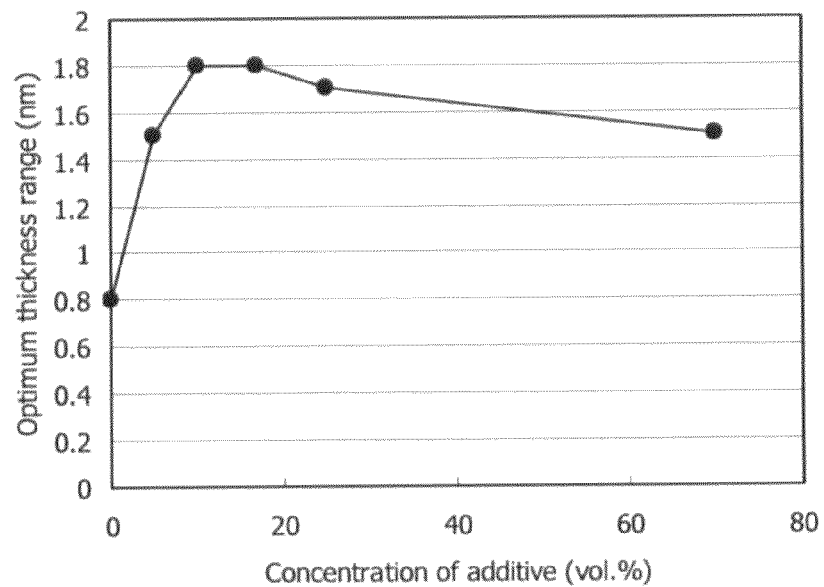
FIG. 12b is a graph showing the optimal film thickness of a seed layer of a magnetic media at varying composition ratios of Cr—W

In the same way as described above, FIG. 12a shows results for another embodiment (embodiment 14), in which the seed layer composition was altered with the film thickness of the seed layer maintained at approximately 1 nm. The horizontal axis expresses the concentration of W added to the Cr. The orientation Δ50 of FePt (002) and MgO (200) are plotted on the vertical axis of (a), while for the compositions plotted in (b), the film thickness of the seed layer was altered, and the range of the seed layer film thickness in which the effects thereof were observed is examined and plotted as the optimum film thickness. In this way, the optimum film thickness is increased and the process margin is improved if W is added to Cr in a concentration of 5 atomic percent. It is clear there-from that, because the addition of W in a concentration greater than 5 atomic percent has an adverse effect on the crystal orientation of the FePt (002) and MgO (200), the added concentration thereof is preferably not less than 5 atomic percent and not more than 25 atomic percent. In terms of broadening the range of the optimum film thickness, the Cr ratio in the added concentration is preferably not less than 10 atomic percent and not more than 90 atomic percent. The added concentration is more preferably not less than 10 atomic percent and not more than 17 atomic percent. The Cr ratio in the added concentrations is more preferably not less than 20 atomic percent and not more than 80 atomic percent.

Figure 13A:
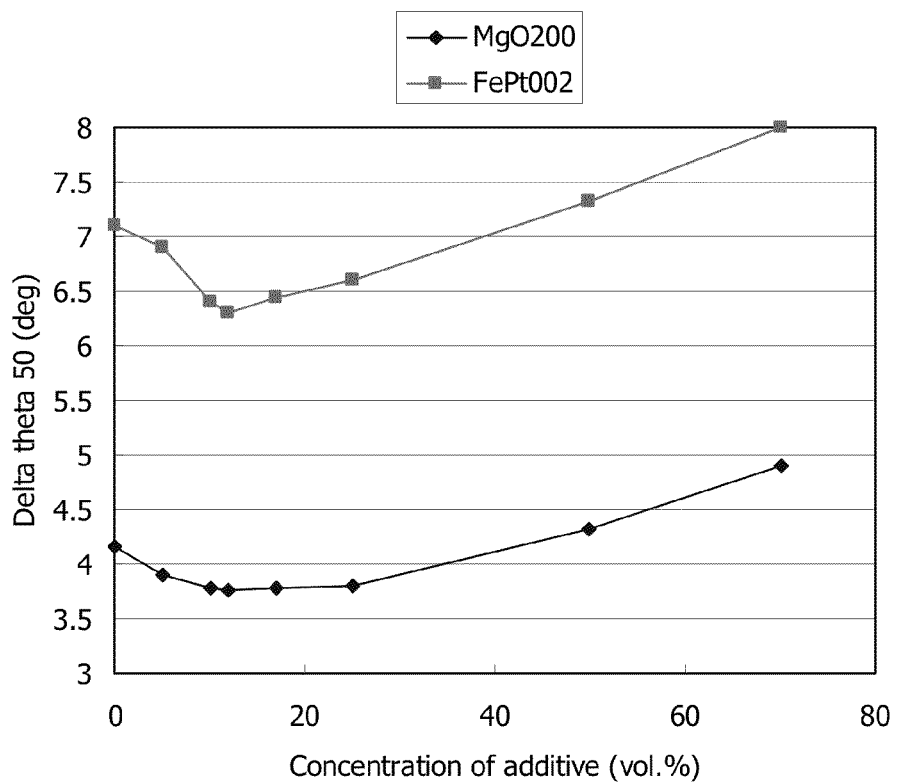
FIG. 13a is a graph showing the crystal orientation of a MgO layer and FePt layer of a media at varying composition ratios of Ni—Cr.
Figure 13B:
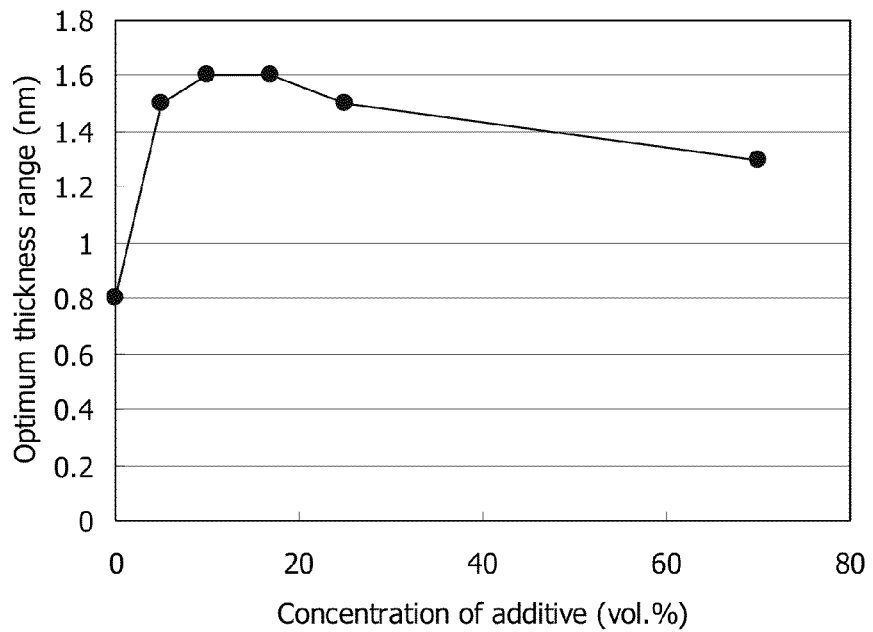
FIG. 13b is a graph showing the optimal film thickness of a seed layer of a magnetic media at varying composition ratios of Ni—Cr.

FIG. 13a shows results for another embodiment (embodiment 15), in which the seed layer composition was altered with the film thickness of the seed layer maintained at approximately 1 nm. The horizontal axis expresses the concentration of Cr added to the Ni. The orientation Δ50 of FePt (002) and MgO (200) are plotted on the vertical axis of (a), while, for the compositions plotted in FIG. 13b, the film thickness of the seed layer was altered, and the range of the seed layer film thickness in which the effects thereof were observed was examined and plotted as the optimum film thickness. The optimum film thickness is increased and the process margin is improved if Cr is added to the Ni in a concentration of 5 atomic percent. It is clear therefore, that, because the addition of Cr in a concentration greater than 5 atomic percent has an adverse effect on the crystal orientation of the FePt (002) and MgO (200), the added concentration thereof is preferably not less than 5 atomic percent and not more than 25 atomic percent. The added concentration thereof is not less than 10 atomic percent and not more than 17 atomic percent.

Figure 14A:
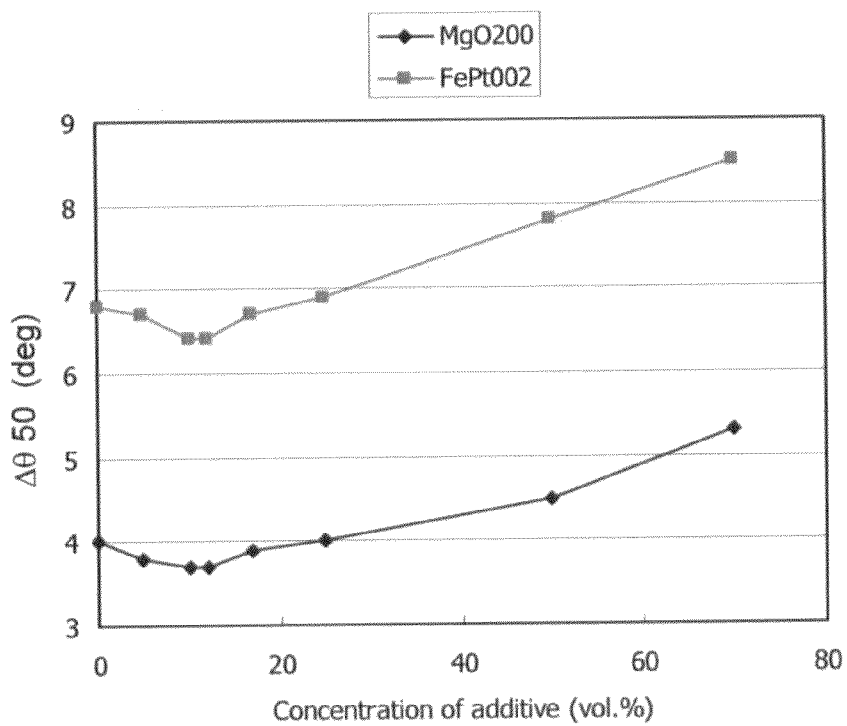
FIG. 14a is a graph showing the crystal orientation of a MgO layer and FePt layer of a media at varying composition ratios of Cr—Co.
Figure 14B:
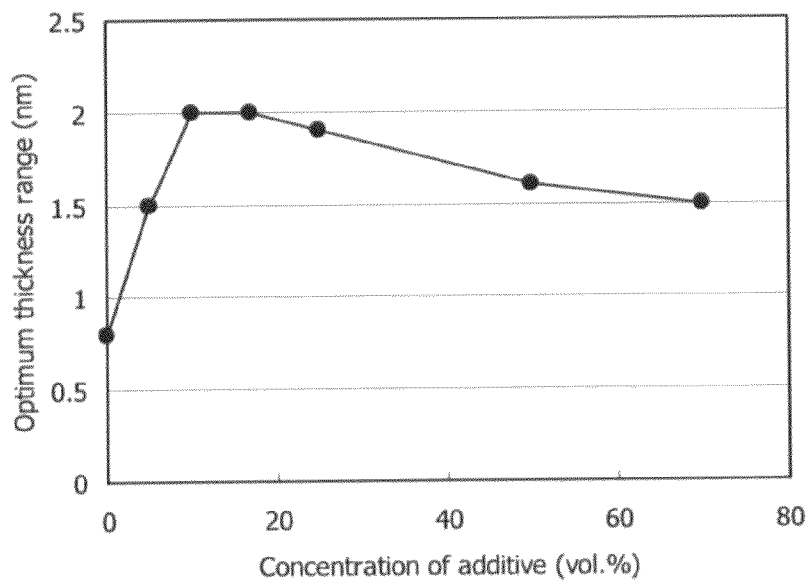
FIG. 14b is a graph showing the optimal film thickness of a seed layer of a magnetic media at varying composition ratios of Cr—Co.

FIG. 14a shows results for another embodiment (embodiment 16) in which the evaluation results for an example in which the seed layer composition was altered with the film thickness of the seed layer maintained at approximately 1 nm. The horizontal axis expresses the concentration of Co added to the Cr. The orientation Δ50 of FePt (002) and MgO (200)

are plotted on the vertical axis of (a), while for the compositions plotted in FIG. 14(b), the film thickness of the seed layer was altered, and the range of the seed layer film thickness in which the effects thereof were observed was examined and plotted as the optimum film thickness. The optimum film thickness is increased and the process margin is improved if the Co is added to the Cr in a concentration of 5 atomic percent. It is clear there-from that, because the addition of Cr in a concentration greater than 5 atomic percent has an adverse effect on the crystal orientation of the FePt (002) and MgO (200), the added concentration thereof is preferably not less than 5 atomic percent and not more than 25 atomic percent. The added concentration thereof is even more preferably not less than 10 atomic percent and not more than 17 atomic percent.

In this way, when elements other than Group A elements are added to the Group A elements, crystal orientation is satisfactory across a broad range of seed layer film thicknesses, and a substantial perpendicular magnetic recording medium is produced.

Figure 15A:
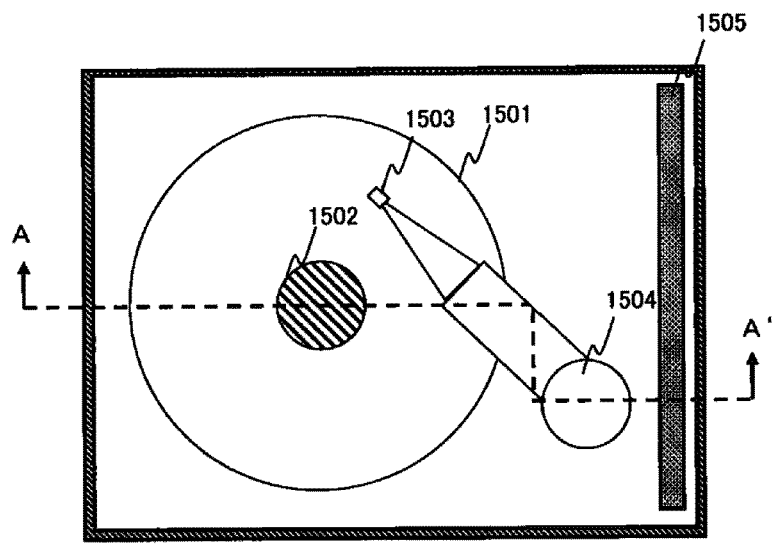
FIGS. 15a-15d is a schematic illustration of an example of a magnetic data recording device in which the present invention may be embodied.
Figure 15B:
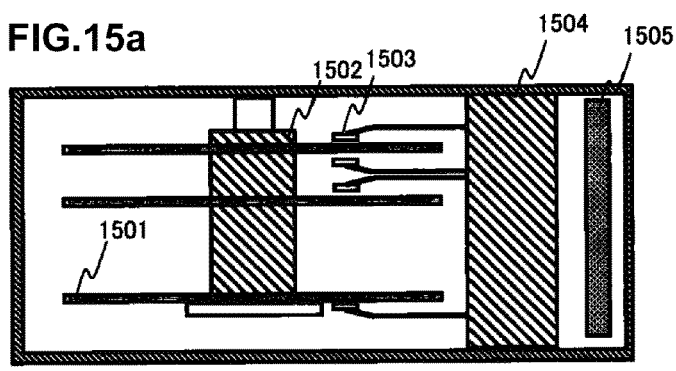
Figure 15C:
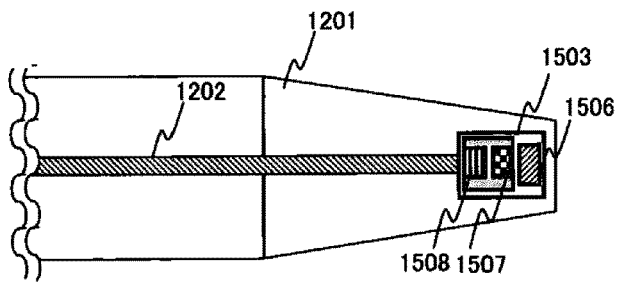
Figure 15D:
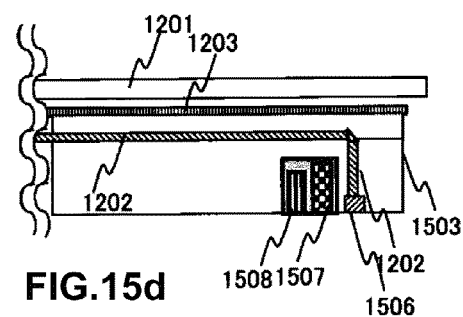

FIG. 15a-d show a schematic illustration of a magnetic data recording device in which the present invention might be embodied. FIG. 15a is a plan view. FIG. 15b is a cross sectional view taken along line A-A' of FIG. 15a. FIG. 15c shows a view of a portion of a suspension assembly 1201, and FIG. 15d side view of a portion of the suspension assembly 1201.

The magnetic data recording device includes: a perpendicular magnetic recording medium 1501; a drive portion 1502 for driving the perpendicular magnetic data recording medium 1501; a slider 1503; an actuator 1504 for moving the slider 1503 over a surface of the medium 1501; and signal processing circuitry 1505. A magnetic write head 1507 and magnetic read sensor 1508 are formed on at trailing portion of the slider 1503. A heat element such as a laser diode 1506 may also be included on the slider 1503 to locally heat the magnetic recording medium in order to temporarily lower the coercivity of the recording layer of the magnetic medium during writing. Near field light can be supplied by way of an optical waveguide 1202 formed on the suspension 1201 for supplying light to the energy irradiation heating element 1506. The slider 1503 can be affixed to the suspension 1202 by way of a flexure 1203.

The magnetic recording medium 1501 includes various layers including a seed layer 103 such as described above with reference to FIG. 1. Using such a magnetic medium with a stable fly height of about 4 nm, a magnetic signal can be recorded, domains of line density direction of approximately 25 nm and track-width direction of 50 nm can be produced, and stable recording and reproducing are possible at long storage periods.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic medium for perpendicular magnetic data recording, comprising:
    a substrate;
    a seed layer formed over the substrate, the seed layer comprising Ni, Cr and W;
    a magnetic under-layer formed over the seed layer; and
    a magnetic recording layer comprising FePt formed over the magnetic under-layer.

2. The magnetic medium as in claim 1 further comprising an amorphous buffer layer between the substrate and the seed layer.

3. The magnetic medium as in claim 1 further comprising a buffer layer having a body centered cubic structure between the substrate and the seed layer.

4. The magnetic medium as in claim 1 wherein the seed layer has a thickness of 0.5 to 1.5 nm.

5. The magnetic media as in claim 1 wherein the seed layer is amorphous.

6. The magnetic media as in claim 1 wherein the seed layer has a body centered cubic structure.

7. The magnetic media as in claim 1 wherein the seed layer has a concentration of W that is 5 to 25 atomic percent.

8. The magnetic media as in claim 1 wherein the has a concentration of W that is 10 to 17 atomic percent.

9. The magnetic media as in claim 1 wherein the sum of the concentrations of Cr and W is 5 to 25 atomic percent.

10. The magnetic media as in claim 1 wherein the concentration of Cr is 5 to 25 atomic percent.

11. The magnetic media as in claim 1 wherein the seed layer further comprises Co and wherein the concentration of Co is 5 to 25 atomic percent.

12. The magnetic media as in claim 1 wherein the seed layer further comprises an element other than Ni, Cr or W in a concentration not greater than 2 atomic percent.

13. The magnetic media as in claim 1 wherein the seed layer further comprises V, Ti or Zr at a concentration not greater than 2 atomic percent.

14. A magnetic data recording device, comprising:
    a magnetic media;
    an actuator; and
    a slider having a magnetic a magnetic read and write head formed thereon and connected with the actuator for movement adjacent to the magnetic media;
    wherein the magnetic media further comprises:
    a substrate;
    a seed layer formed over the substrate, the seed layer comprising Ni, Cr and W
    a magnetic under-layer formed over the seed layer; and
    a magnetic recording layer compising FePt formed over the magnetic under-layer.

15. The magnetic data recording system as in claim 14, wherein the magnetic media further comprises an amorphous buffer layer between the substrate and the seed layer.

16. The magnetic data recording system as in claim 14, wherein the magnetic media further comprises buffer layer having a body centered cubic structure between the substrate and the seed layer.

17. The magnetic data recording system as in claim 14, wherein the seed layer has a thickness of 0.5 to 1.5 nm.

18. The magnetic data recording system as in claim 14, wherein the seed layer is amorphous.

19. The magnetic data recording system as in claim 14, wherein the seed layer has a body centered cubic structure.

* * * * *